June 12, 1928.  L. F. MEUNIER  1,673,012
ELECTRICAL TOOL
Filed May 5, 1925
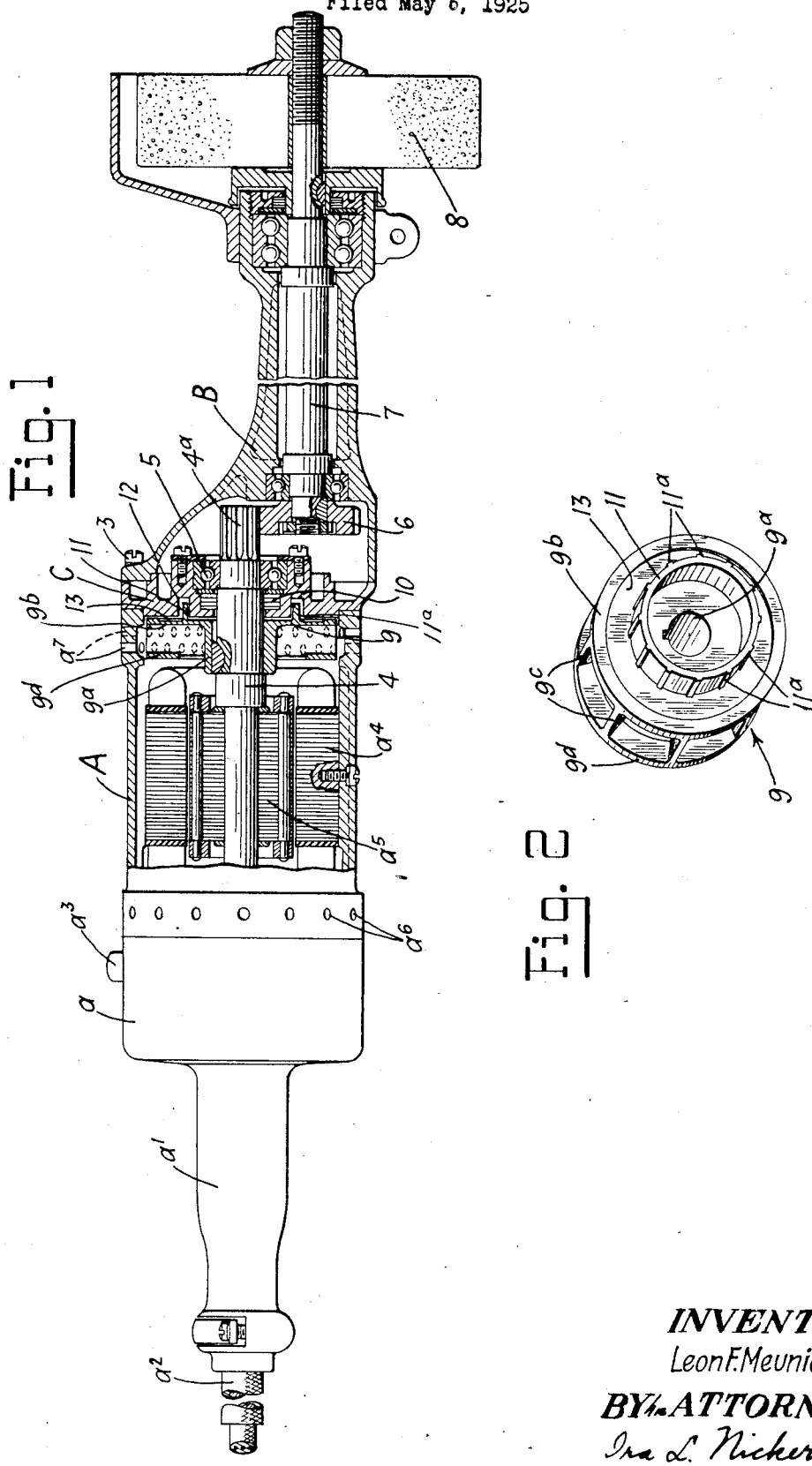
INVENTOR
Leon F. Meunier
BY his ATTORNEY
Ira L. Nickerson Patented June 12, 1928.

1,673,012

UNITED STATES PATENT OFFICE.

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY.

ELECTRICAL TOOL.

Application filed May 5, 1925. Serial No. 28,046.

This invention relates to electrical motors utilized for driving machinery. While capable of general application, it has been developed especially for use in connection with portable or hand operated electrical tools, such as drills, grinders, reamers, tappers, etc.

For efficient operation an electrical motor requires some arrangement for cooling it. The usual practice is to pass a current of air through the interior of the motor. As the air for cooling purposes is ordinarily taken from the surrounding atmosphere, any dust, grit, grinding material, bits of metal, etc. which may be present are drawn into and circulated through the motor. In portable outfits the cooling medium is usually drawn from the rear end of the tool and discharged near the front or working tool end. There is accordingly a tendency of the dust and grit to accumulate near the forward bearing of the motor shaft along which it gradually works into the gear case, producing undue wear and greatly decreasing the life and efficiency of the gearing and of the bearings supporting the same and adjacent thereto.

Among the objects of the invention are to prevent or at least greatly to diminish the wear produced by grit and dirt on the enclosed parts of machines of the class described, to provide novel means for accomplishing the above result, and in general to improve prior devices in the interests of more satisfactory and efficient service.

In order to illustrate the invention one concrete embodiment thereof is shown in the accompanying drawings, in which:

Fig. 1 is a longitudinal sectional view partly in elevation; and

Fig. 2 is a perspective view of the air circulating fan shown in Fig. 1.

The invention is illustrated as embodied in a portable electrical grinder having a casing for the parts thereof consisting of a motor housing A, a transmission housing B, and a partition or transfer plate C interposed between the same, the parts of the casing being secured together in any suitable manner as by bolts 3. The rear or left end of motor housing A is closed by a head $a$ having a handle extension $a'$ within which the power cable $a^2$ is secured. Head $a$ may enclose suitable switch mechanism (not shown) controlled by a push button $a^3$. The stator $a^4$ and the rotor $a^5$ comprising the electrical motor are enclosed within housing A and the armature shaft 4 extends through transfer plate C into transmission housing B, a bearing 5 being provided for the shaft in transfer plate C. The end of armature shaft 4 is formed with teeth to serve as a pinion $4^a$ meshing with a gear 6 secured to a driven shaft 7 which carries the working tool, such as a grinding wheel 8, shaft 7 being supported by suitable bearings in the transmission housing B.

In accordance with the usual practice, a fan 9 is secured on armature shaft 4 for rotation therewith adjacent transfer plate C, the fan comprising a hub portion $9^a$ sleeved over shaft 4 and keyed thereto and an annular disk or plate portion $9^b$ adjacent transfer plate C and carrying on the side toward the motor air agitating means in the form of radially extending blades $9^c$ the outer ends of which may be connected if desired by an annular ring $9^d$. Fan 9 serves to draw cooling air into the motor casing A through the annular series of inlet port $a^6$ and to expel the air after it has passed through the motor through the spaced annular series of outlet ports $a^7$. Air taken from around the tool is thus passed with velocity through the motor towards the transmission housing B and any dirt, grit, grinding material or bits of metal present in the air and not forced by the fan through the outlet ports $a^7$ tend to accumulate around and behind (that is forwardly or to the right of) fan 9, whence they work along armature shaft 4 toward bearing 5 and the parts of the transmission therebeyond, quickly cutting out any packings such as indicated at 10. The grit and other foreign material then attacks the bearing 5 and the transmission and bearings therebeyond resulting in unduly rapid wear.

The means for largely overcoming, if not entirely preventing, the grit and other foreign matter in the cooling air from reaching the parts just enumerated, which means constitute the present invention, will now be described. To accomplish the desired result the direct path for grit to reach armature shaft 4 beyond fan 9 is intercepted or broken by means which will obstruct the passage of such grit and force it back to the outlet ports $a^7$. To this end cooperating means on fan 9 and transfer plate C are provided comprising an annular transversely projecting flange 11 of substantial width on the fan 9 projecting into an annular slot or groove 12 in the transfer plate. Flange 11 is arranged to approach rather closely to the inner side of groove 12 leaving a wider space toward the outer face of the groove. To produce a greater outward movement of air from this space, suitable projections such as ribs $11^a$ may be formed on flange 11. The volume of the air acted upon by flange 11 may be increased by recessing or grooving the disk portion $9^b$ of the fan as indicated at 13 intermediate flange 11 and the periphery of the fan. In the operation of the tool any dirt or other foreign matter which passes behind the fan 9 will be opposed by the whirling mass of air agitated by flange 11. If it is heavy enough to fall through and strike the flange, it will immediately be thrown off due to the high peripheral speed of the flange. In the event that any foreign matter should by some chance find passage to the inside diameter of the flange 11, it will be kept there in contact with the flange due to centrifugal force.

From the above it will be apparent that the present invention is adapted to prevent the passage of dirt and other foreign matter to the bearings and gears in the transfer plate C and transmission housing B by producing an opposing or counter current of air behind the fan and adjacent to the transfer plate, and that the provision of a flange on the fan cooperating with a groove in the transfer plate receiving the same, particularly with a relatively close fit of the flange to the inner face of the groove, not only produces the counter current of air above referred to but also encloses the entrance to the bore of the transfer plate with a whirling barrier across the normal path of movement of foreign material to the transmission housing.

While what is now considered to be the preferred form of the invention has been herein shown and described it is to be understood that the invention is not to be confined to the specific structural details thereof but covers all changes, modifications and adaptations thereof within the scope of the appended claims.

I claim as my invention:

1. In combination, a casing, an electric motor therein, a bearing for the armature shaft of said motor within said casing, a packing for said shaft adjacent said bearing and a fan on said shaft adjacent said bearing for circulating air through said motor to cool the same, said fan having an annular flange of substantial width projecting from the closed side thereof over and in spaced relation to said shaft, said flange projecting into a recess therefor in the adjacent portion of the motor casing.

2. In a power driven tool, a casing, an electric motor and a transmission therein, said transmission being arranged to drive a working tool, a transfer plate between said motor and said transmission, said plate presenting a flat face toward said motor and providing a bearing for the armature shaft of said motor, means for circulating air through said motor including a fan on said shaft adjacent the flat face of said plate, and cooperating means on said fan and said plate for preventing grit and dirt present in the circulated air from working into said transmission including an annular projecting flange on said fan and an annular recess in the flat face of said plate, said recess being in spaced relation to the bearing opening in said plate.

3. In a power driven tool, a casing, an electric motor and a transmission therein, said transmission being arranged to drive a working tool, a transfer plate between said motor and said transmission providing a bearing for the armature shaft of said motor, a packing for said shaft adjacent said bearing, means for circulating air through said motor including a fan on said shaft adjacent said plate, and cooperating means on said fan and said plate for preventing grit and dirt present in the circulating air from reaching said packing including an annular projecting flange on said fan and an annular recess in said plate into which said flange projects, said flange being disposed closer to the inner face than to the outer face of said recess.

4. In a power driven tool, a casing, an electric motor and a transmission therein, said transmission being arranged to drive a working tool, a transfer plate between said motor and said transmission, said plate presenting a flat face toward said motor and providing a bearing for the armature shaft of said motor, a packing for said shaft adjacent said bearing, means for circulating air in and through said motor including a fan on said shaft adjacent the flat face of said plate, and cooperating means on said fan and plate for preventing grit and dirt present in the circulated air from reaching said packing including an annular recess in the flat face of said plate, said recess being in spaced relation to the bearing opening in said plate.

5. In a power driven tool, a casing, an electric motor and a transmission therein, said transmission being arranged to drive a working tool, a transfer plate between said motor and said transmission, said plate presenting a substantially flat face toward said motor, and providing a bearing for the armature shaft of said motor, means for circulating air in and through said casing to cool said motor including a fan on said shaft adjacent the flat face of said plate, and co-operating means on said fan and plate for preventing grit and dirt present in the circulated air from reaching said bearing including an annular flange on said fan on the side adjacent said plate and air agitating means on the outer face of said flange.

6. In a power driven tool, a casing, an electric motor and a transmission therein, said transmission being arranged to drive a working tool, a transfer plate between said motor and said transmission, said plate presenting a substantially flat face toward said motor and providing a bearing for the armature shaft of said motor, means for circulating air in and through said casing to cool said motor including a fan on said shaft adjacent the flat face of said plate, and co-operating means on said fan and plate for preventing grit and dirt present in the circulated air from reaching said bearing comprising an annular recess in the flat face of said plate, a flange on said fan extending into said recess and closely approaching the inner wall thereof, and air agitating means on the outer face of said flange.

7. In a power driven tool, a casing, an electric motor and a transmission therein, said transmission being arranged to drive a working tool, a transfer plate between said motor and said transmission, said plate presenting a substantially flat face toward said motor and providing a bearing for the armature shaft of said motor, said plate having an annular recess in the flat face thereof, and means for circulating air in said casing to cool said motor and to keep grit and dirt out of said bearing comprising a fan on the shaft of the motor having an annular flange on the side adjacent the flat face of said plate, said flange extending within said recess, said face of said fan being recessed intermediate its periphery and said flange.

Signed by me at Cleveland, Ohio, this 28 day of April, 1925.

LEON F. MEUNIER.